J. A. SHEPHARD.
Pitman Connections.
No. 140,312.    Patented June 24, 1873.
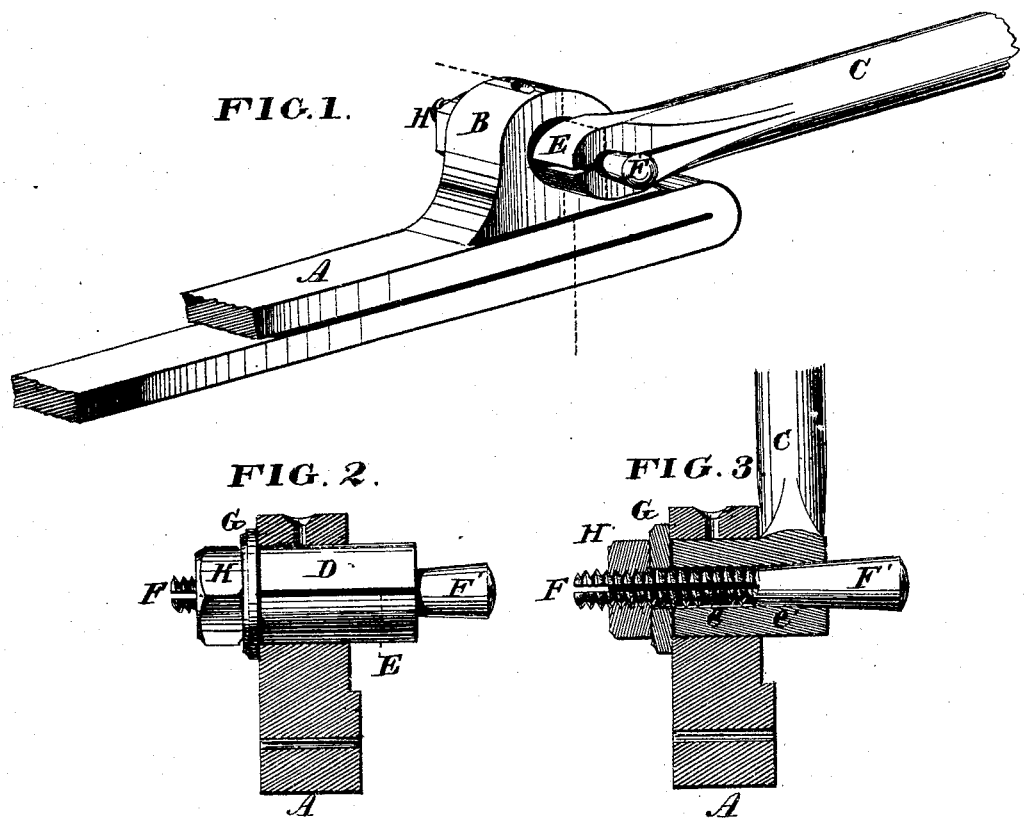
WITNESSES.    INVENTOR.

UNITED STATES PATENT OFFICE.

JOSEPH A. SHEPHARD, OF PORTSMOUTH, OHIO.

IMPROVEMENT IN PITMAN CONNECTIONS.

Specification forming part of Letters Patent No. 140,312, dated June 24, 1873; application filed December 20, 1872.

*To all whom it may concern:*

Be it known that I, JOSEPH A. SHEPHARD, of Portsmouth, in the county of Scioto, Ohio, have invented an Improved Harvester Pitman-Coupling, of which the following is a specification:

The efficient operation of a harvester-cutter is well known to be largely dependent on the knife making a full stroke in each direction without sensible cessation at the ends of the stroke, and without stopping short of a complete passage of the blades within their respective guards on either side, so as to afford no opportunity for any uncut bunches of grass to accumulate, and thus choke the apparatus, entailing great and useless labor on the horses, and bad and imperfect work. Such defective action is chiefly due to the slack motion incident to the wear of the coupling-joint under the violent reciprocating action of the knife in ordinary use. To remedy this defect various devices have been contrived, but none, so far as known to me, that combine the same mechanical expedients which compose my coupling. These expedients consist essentially of an expansible split wrist, which, being inserted in the heel of the knife, receives a pin having a tapering head and split and screw-threaded shank, which, after the nut has been screwed home, can be expanded so as to lock the nut securely upon the pin, and so that, as the wrist wears in the heel eye, it can be expanded from time to time by screwing the nut further on and locking the same to its thus advanced position.

Figure 1 is a perspective view of a harvester pitman-coupling embodying my invention. Figs. 2 and 3 are the axial sections of the knife heel, the pitman-wrist, nut, and washer being shown in elevation in Fig. 2, and in section in Fig. 3.

A represents the heel portion of a customary harvester knife-bar; B, a customary heel-eye; C, the outer extremity of a harvester pitman; D, the pitman-wrist. The said wrist is separated into two equal portions by a rift, E, in the common plane of the axes of the wrist and pitman, and this rift extends some distance back into said pitman, substantially as shown in Fig. 1. The opposing surfaces of the rift are channeled to form an eye or central orifice in the wrist. That portion of said wrist eye beyond the pitman forms a cylindrical orifice, e, which, toward its other end, gradually flares outward, as at e'. Into this orifice e e' I insert a pin, whose portion first entered is cylindrical screw threaded, and split or divided along its axis, as at F, whence it flares outward, as at F', to correspond with and occupy the flaring portion e' of the orifice e e'. A washer, G, is then slipped onto the protruding screw-threaded end of the pin, and a nut, H, being afterward screwed thereupon, so as to force the washer well home against the heel-eye, the split ends of the pin are finally spread so as to securely lock the nut to its bearings, and secure a coupling-joint free from lost motion and back-lash.

When the joint has worn at all loose it can be restored to its original condition by simply screwing forward the nut so as to draw the pin F F' further into the orifice e e', and thus spread the wrist D, and cause it to again fully occupy the heel-eye. The ends of the pin being then again further spread so as to lock the nut, the joint is thereby restored to its original condition.

As this operation of setting up the joint can be performed at any moment by the husbandman without the aid of a mechanic, and without leaving the harvest field, he is enabled to anticipate and wholly prevent any imperfect action of the knife.

I claim herein as new and of my invention—

The split harvester-pitman C D E, having the described orifice e e', in the described combination, with the split, threaded, and flaring pin F F', and nut H, the whole being formed and arranged in the manner and for the purpose set forth.

JOSEPH A. SHEPHARD.

Witnesses:
W. H. H. CADOT,
W. B. GRIER.